May 11, 1926.

C. L. A. M. LEBLANC 1,584,383

HIGH SPEED ELECTRIC MACHINE

Filed March 21, 1922   2 Sheets-Sheet 1

INVENTOR
Charles L. A. M. Leblanc
By Greew and McCallister
His Attorneys.

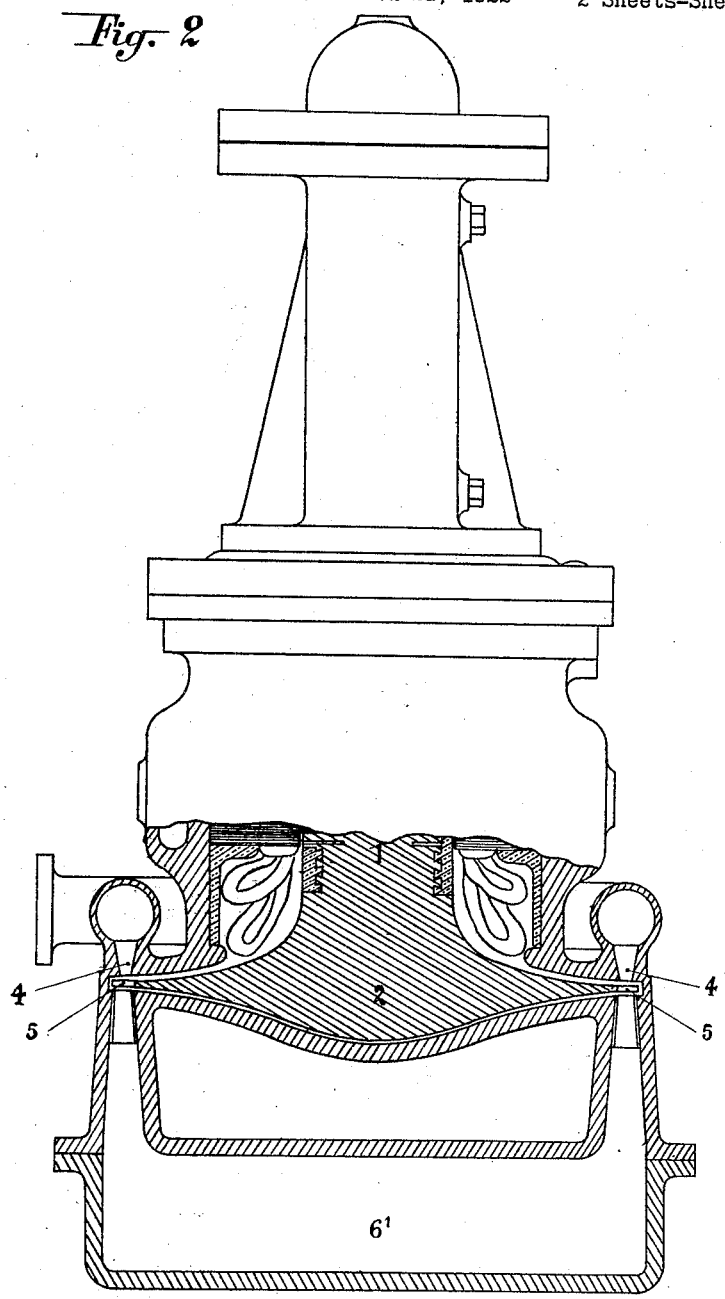

Patented May 11, 1926.

1,584,383

UNITED STATES PATENT OFFICE.

CHARLES LÉONARD ARMAND MAURICE LEBLANC, OF PARIS, FRANCE, ASSIGNOR TO SOCIÉTÉ ANONYME POUR L'EXPLOITATION DES PROCÉDÉS MAURICE LEBLANC-VICKERS, OF PARIS, FRANCE.

HIGH-SPEED ELECTRIC MACHINE.

Application filed March 21, 1922. Serial No. 545,467.

The object of the present invention is a machine constituted by an aggregate comprising a dynamo-electric machine, either generator or motor, in combination with a high speed rotary motive engine with a single wheel, such as a Laval turbine, or with a mechanical motor, such as an air compressor with a single wheel rotating at a high speed, the dynamo-electric machine running at the same speed as the latter machines.

It would be impossible for mechanical reasons to place windings in the rotor of such a dynamo-electric machine; the only practical method of construction in such a case is, to use a rotor similar to that of a squirrel cage asynchronous motor, said rotor being a solid steel cylinder, having slots on its periphery parallel to its axis; in place of the squirrel-cage winding, molten aluminium is cast into the slots; with this construction it is possible to run the rotor at a tangential speed of 300 metres per second.

Under these conditions it becomes possible to absorb the whole power supplied by a full admission Laval turbine, without having to make it extravagantly long. On the other hand a high power compressor can be driven direct.

But then the resisting or motor couple developed on the shaft of the dynamo-electric machine becomes large, and it would be difficult to give the shaft transmitting such couple, a suitable degree of flexibility without making it very long.

To overcome this drawback I have invented the following arrangement, which is the essential characteristic of the present invention, viz, the rotor of the dynamo-electric machine and the rotor of the turbine or compressor are made of a single perfectly rigid mass. The transmission shaft between the dynamo-electric machine and the turbine or the compressor is thus done away with. In such conditions the shaft carrying the single rotor has not to transmit any couple, and any desired degree of flexibility may be given to it.

The rotor of the dynamo-electric machine rotates in the same environment as that of the turbine or compressor, which will generally be a vacuum. This will be very advantageous for the efficiency, as all ventilating losses will be saved. No difficulty will arise in cooling the rotor of the dynamo-electric machine which is directly connected to the turbine or compressor by metallic masses of large cross section and small lengths which consequently will conduct heat very well. The heat thus conveyed into the turbine or compressor will be carried off by the current of fluid in one or other of them.

In order to lessen Foucault currents in the rotor, it is provided with slots drilled in planes, perpendicular to the axis. As the frequency of such currents in the rotor is very low, the amount of heat given off from this cause will be very small; it will be passed on, as above stated, to the turbine or compressor and carried off by the current of fluid.

The stator is constructed according to the ordinary rules for asynchronous machines; the winding is preferably bipolar and carried on very thin sheet iron rings, these rings are cooled by a current of water outside, which will carry off the heat produced by hysteresis. The quantity of this heat will be large owing to the high frequency of the flux variation.

Fig. 2 is an elevation, partly in section, of a rotary machine showing a single wheel turbine and a dynamo-electric generator.

Figure 1:
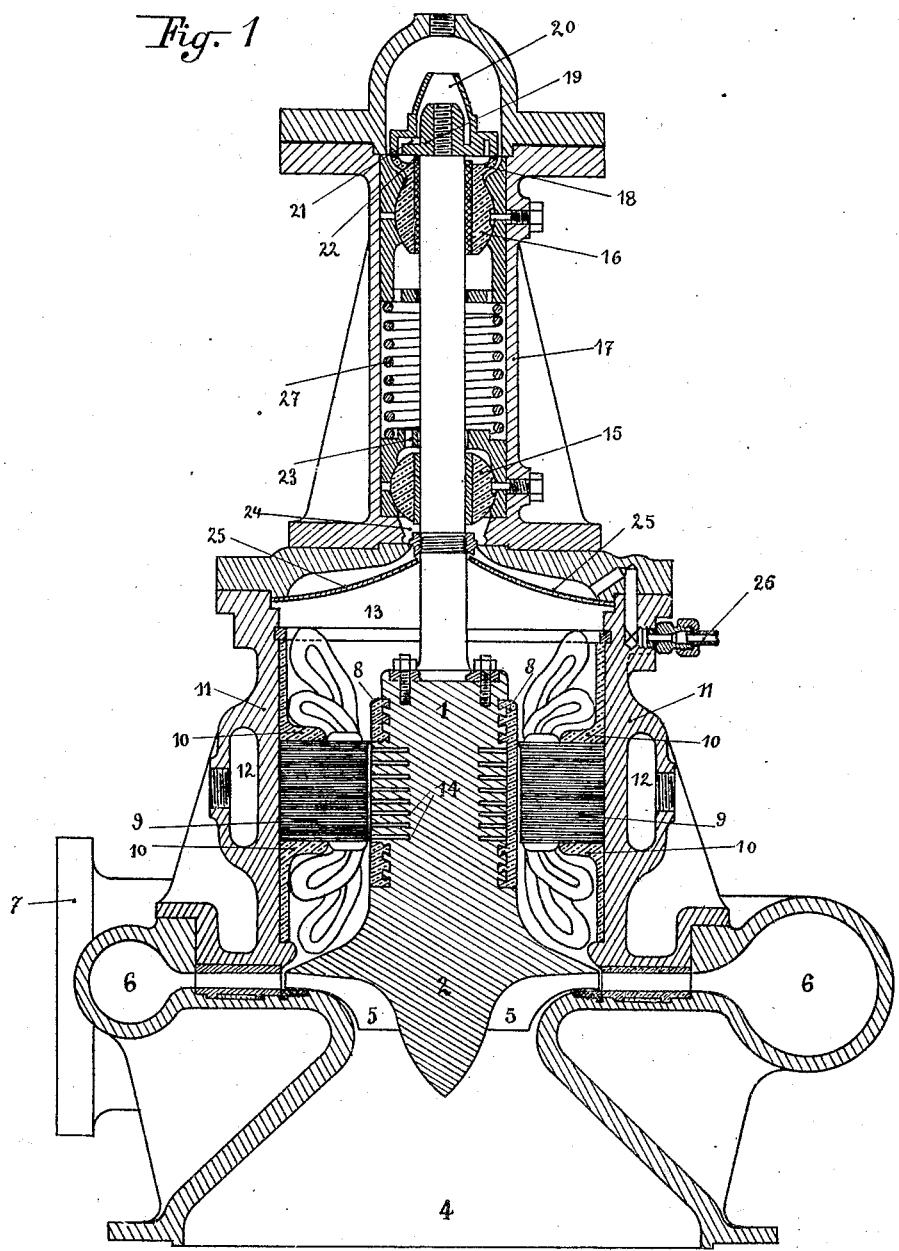
Figure 1 is a longitudinal section of a high speed machine, embodying my invention and showing a dynamo electric machine combined with a centrifugal compressor.

The machine represented in Fig. 1, applicable to many uses, may be intended to exhaust air or steam from a chamber where there is a low pressure for instance the evaporator of a refrigerating machine, and to impel it into a chamber where there is a higher pressure, said chamber being the condenser in the case of a refrigerating machine. It might equally well be used to effect the evaporation in vacuo of solutions to be concentrated, or to exhaust the vapour produced and to compress it for recondensation, thus recovering the heat of evaporation.

The rotating element of this compressor consists of a single massive rotor 1, 2, carried by the flexible shaft 3. The upper part 1 of this rotor is cylindrical and forms the rotor of the driving motor, whilst the lower part 2 is given the shape of a compresser wheel.

The fluid to be compressed is drawn in through the pipe 4 and discharged through the passages 5 into the converging volute chamber 6, where it is compressed and whence it issues at 7.

A rotary movement is communicated to the rotating element by the squirrel-cage motor 1—9. The conductors of the rotor are constituted by aluminium bars 8 cast in slots arranged on the periphery of the cylinder 1. The cross slots 14 in the rotor tend to prevent the production of Foucault currents. The stator 9, constructed of rings of sheet iron, which carry the windings, is supported by the brackets 10. These brackets have a general cylindrical shape, and are made of very fine iron wire cemented together by any suitable insulating material. They act as a screen to prevent magnetic leakages.

The whole aggregate of these several elements is placed in an air-tight-casing 13 inside the frame 11. On the outside of the casing and in close proximity to the cores of the stator, there is provided a channel 12 for the circulation of the cooling water.

The rotating element 1—2 is hung at the upper end of the elastic shaft 3 by a pivot 18, 19, which is guided by spherical bearings 15 and 16, attached to the wall of the casing 17.

The bearing 16 is provided with a shoulder 18 which constitutes the fixed part of the pivot on which the shaft is hung by means of the cap 19 fixed on the shaft. The lubricating oil for the bearings enters at 20. The cap 19 is provided with vanes and acts as a centrifugal oil-pump; the oil is discharged at 21 through suitable channels 23 and 24, flows down the casing 17 is collected in the chamber 25 with a conical bottom and escapes at 26.

The oil under pressure in the slot or slots 22 slightly lifts the shaft, which thus is really borne, not on the shoulder 18 but on the oil under pressure. The spring 27 tends to keep the two spherical bearings at a constant distance apart.

These arrangements are described only by way of example. Instead of hanging the rotors by the free end of an elastic shaft, it might be carried by an elastic shaft supported at each end in bearings.

The squirrel-cage electric motor which imparts to the machine its rotary movement is supplied with current from a high frequency alternator which is started up at the same time.

The generator represented in Fig. 2 is an asynchronous machine of identical construction to that of the motor in the aforementioned case. As in that case its rotor 1 constitutes a single mass with the turbine wheel 2, and the aggregate is carried by the elastic shaft 3. Steam enters the blades 5 of the turbine 2 through the ring of nozzles 4 and escapes into the condenser 6'. The turbine together with the generator rotate in the vacuum of the condenser.

The rotation of the rotor 1 of the generator, driven by the turbine at a speed above that of synchronism, produces in the conductors, as is known, currents which may be fed to a supply network, always provided that the conductors are previously and suitably excited by alternating currents.

According to a known method the generator for example is excited by means of a synchronous motor, which supplies to it the wattless current required for exciting it, whilst the motor takes from the generator the current required for its working.

To start up, the synchronous motor is set running by means of its exciter, operating as a motor, for which purpose it is supplied with current from a battery of accumulators which are subsequently recharged whilst the machine is working; the turbine is started up simultaneously, the synchronous motor is excited, and the accumulators are cut out.

The currents supplied by this machine will as a rule be of high frequency and are ill adapted for ordinary industrial use; but they may be converted into continuous current by means of apparatus such as mercury vapour rectifiers, or electroionic valves.

What I claim is:—

1. A high speed machine, including in combination a flexible shaft, a metallic mass suspended from said flexible shaft and so constructed and arranged as to constitute both the rotor of an electric machine and a rotor of a single wheel rotary machine, said rotors being contiguous and in alignment and a single casing enclosing said rotors.

2. A high speed machine including in combination a flexible shaft, a metallic mass suspended from said shaft and so constructed and arranged as to constitute both the rotor of an electric machine and the rotor of a single wheel rotary machine, said rotors being contiguous and in alignment, a single casing enclosing said rotors, a stator of an electric machine surrounding said first named rotor and fluid carrying elements co-operating with the rotor of said single wheel rotary machine.

3. A high speed machine including a flexible shaft, a metallic mass hung from said shaft and so constructed and arranged as to constitute both the rotor of an electric machine and the rotor of a single wheel rotary machine, said rotors being contiguous and in alignment, a single casing enclosing said mass, a stator surrounding the rotor of said electric machine, fluid carrying elements co-operating with the rotor of said single wheel rotary machine, longitudinally extending slots formed in said mass and aluminum bars in said slots forming a squirrel cage element.

4. A high speed machine including in combination a flexible shaft, a metallic mass hung from said shaft and so constructed and arranged as to constitute both the rotor of an electric machine and the rotor of a single wheel rotary machine, said rotors being contiguous and in alignment, a single casing enclosing said mass, an electric stator surrounding said electric rotor, longitudinally extending slots formed in said electric rotor, aluminum bars positioned in said slots so as to form a squirrel cage element, radially extending slots formed in said electric rotor so as to prevent Foucault currents and fluid carrying elements cooperating with the rotor of said single wheel rotary machine.

5. A high speed machine, comprising a frame, spherical bearings, a vertical flexible shaft revoluble in said bearings, a rigid mass hung at the lower end of said flexible shaft, a dynamo rotor formed on the said rigid mass, a dynamo stator cooperating with said rotor, a turbine rotor consisting of a single wheel formed at the lower part of said rigid mass, and means for cooperating with the turbine rotor.

In testimony whereof I have signed this specification.

CHARLES LÉONARD ARMAND MAURICE LEBLANC.